US008694623B1

(12) United States Patent
Stephen et al.

(10) Patent No.: US 8,694,623 B1
(45) Date of Patent: Apr. 8, 2014

(54) METHODS AND APPARATUSES FOR REMOTE CACHING

(75) Inventors: Nick Stephen, Saint Martin d'Uriage (FR); Guillaume Bozon, Saint Jeoire (FR)

(73) Assignee: Oracle America, Inc., Redwood City, CA (US)

( * ) Notice: Subject to any disclaimer, the term of this patent is extended or adjusted under 35 U.S.C. 154(b) by 742 days.

(21) Appl. No.: 12/178,398

(22) Filed: Jul. 23, 2008

(51) Int. Cl.
*G06F 15/173* (2006.01)
*H04L 29/08* (2006.01)
*G06F 15/16* (2006.01)
*G06F 9/46* (2006.01)
*G06F 9/54* (2006.01)

(52) U.S. Cl.
CPC ..... *H04L 29/08144* (2013.01); *H04L 29/08099* (2013.01); *G06F 15/16* (2013.01); *G06F 9/465* (2013.01); *G06F 9/54* (2013.01)
USPC ............................ 709/224; 709/214; 709/220

(58) Field of Classification Search
USPC ................................................. 709/223–226
See application file for complete search history.

(56) References Cited

U.S. PATENT DOCUMENTS

| 6,721,740 B1* | 4/2004 | Skinner et al. .......................... 1/1 |
| 2002/0049603 A1* | 4/2002 | Mehra et al. ....................... 705/1 |
| 2005/0092825 A1* | 5/2005 | Cox et al. ....................... 235/375 |
| 2006/0184662 A1* | 8/2006 | Rivierre et al. ............... 709/224 |

\* cited by examiner

*Primary Examiner* — Ian N Moore
*Assistant Examiner* — Jackie Zuniga Abad
(74) *Attorney, Agent, or Firm* — Polsinelli PC

(57) ABSTRACT

Methods and apparatuses are presented for managing remote computers. In one or more embodiments, the apparatus includes one or more management servers comprising a registry of manageable objects. The one or more management servers are capable of being executed on a first machine. One or more management applications are coupled to the one or more management servers. The one or more management applications are capable of being executed on a second machine, where the first and second machines are separate. A first cache connector is coupled to the one or more management servers, where the first cache connector retrieves and stores at least one of the manageable objects listed in the registry. A second cache connector is coupled to the one or more management applications, where the first and second cache connectors form a cache management connection. The processing required to implement the first cache connector is distributed across the first machine.

14 Claims, 4 Drawing Sheets

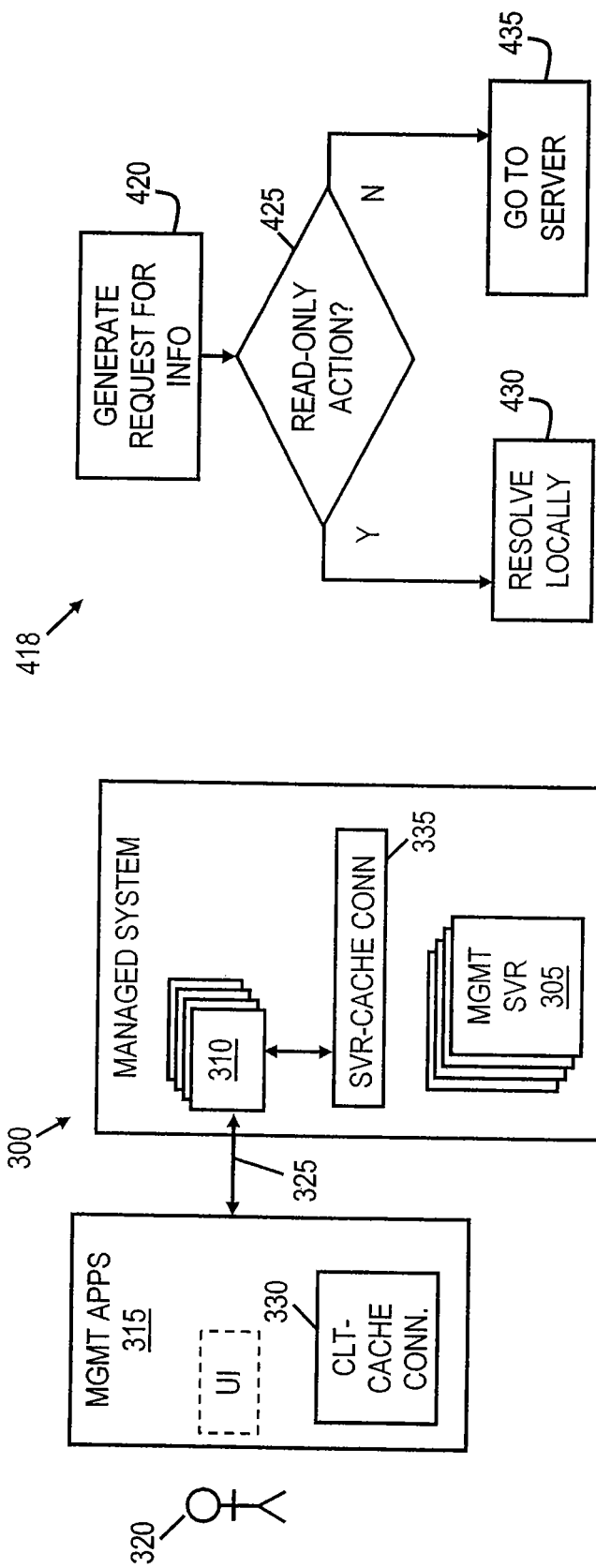

METHODS AND APPARATUSES FOR REMOTE CACHING

CROSS-REFERENCE TO RELATED APPLICATIONS

This application is related to U.S. Nonprovisional patent application Ser. No. 12/178,358, entitled "Methods and Apparatuses for Monitoring and Configuring Remote Sub-Systems Using a Feed," filed on the same date as the instant application and incorporated by reference as if set forth in full below.

BACKGROUND

Computers are ubiquitous in today's society. They come in all different varieties and can be found in places such as automobiles, the grocery store, banks, personal digital assistants, cell phones, as well as in many businesses. As will be appreciated by almost anyone owning a computer, computers often need to be configured and re-configured for various reasons. For example, a computer may need to have all of the hardware drivers updated because the computer manufacturer has made new drivers available. Alternatively, a computer system may need to have its operating system updated.

In a company environment, sometimes called an "enterprise" scenario, the company may have hundreds or thousands of computers all of which will need to be updated from time to time. People typically referred to as "system administrators" or the like are often employed by these companies, where the primary responsibility of the system administrator may be updating all the computers within an organization. Additionally, system administrators are often tasked with ensuring that the computers continue to operate properly. In an organization that includes hundreds or thousands of computers, the task of monitoring various configuration details and monitoring the computers' operational status can be daunting. This problem is only exacerbated when the company's computers are spread out all over the world in different geographic locations.

While a company's remote systems may be monitored and configured by the system administrator, if the remote computers and the system administrator are connected via the Internet, firewalls are often implemented to prevent access by hackers with surreptitious motives. Because of these firewalls, specific routing through the firewall is often required to allow the system administrator remote access. This specialized routing not only compromises the integrity of the firewall by providing a potential access point for hackers, it also may require additional effort on behalf of the system administrator of making specialized and often customized changes to the firewall, such changes might be done remotely or involve the additional burden of traveling to some or all remote locations.

Remote computer management of systems that are located all over the world also can be very slow and time consuming. For example, if a system administrator simply wants to determine, for each of the hundreds or thousands of systems being managed, which operating system they are running, he would have to issue a command to each of the remote computers and wait for a response, including the latency associated with each of the remote computers.

Thus, a remote monitoring and configuration system is needed that addresses one or more of these problems.

SUMMARY

Some embodiments include a computer system that is capable of being managed by a remote manager. In one or more embodiments, the computer system includes one or more management servers comprising a registry of manageable objects. The one or more management servers are capable of being executed on a first machine. One or more management applications are coupled to the one or more management servers. The one or more management applications are capable of being executed on a second machine, where the first and second machines are separate. A first cache connector is coupled to the one or more management servers, where the first cache connector retrieves and stores at least one of the manageable objects listed in the registry. A second cache connector is coupled to the one or more management applications, where the first and second cache connectors form a cache management connection. The processing required to implement the first cache connector is distributed across the first machine.

Other embodiments include a method for remotely managing a computer system. The method includes executing one or more management servers comprising a registry of manageable objects on a first machine and executing one or more management applications on a second machine, where the one or more management applications are coupled to the one or more management servers. The method also includes retrieving at least one of the manageable objects listed in the registry with a first cache connector, storing at least one of the manageable objects listed in the registry with the first cache connector, forming a cache management connection between the first cache connector and a second cache connector, and distributing the processing required to implement the first cache connector across the first machine.

BRIEF DESCRIPTION OF THE DRAWINGS

For a detailed description of the various embodiments of the invention, reference will now be made to the accompanying drawings, in which:

FIG. 3 depicts a managed system including one or more cache connectors;

FIG. 4 is a flow chart depicting one method of fulfilling information needs at a user interface.

The use of the same reference symbols in different drawings indicates similar or identical items.

DETAILED DESCRIPTION

Figure 1:
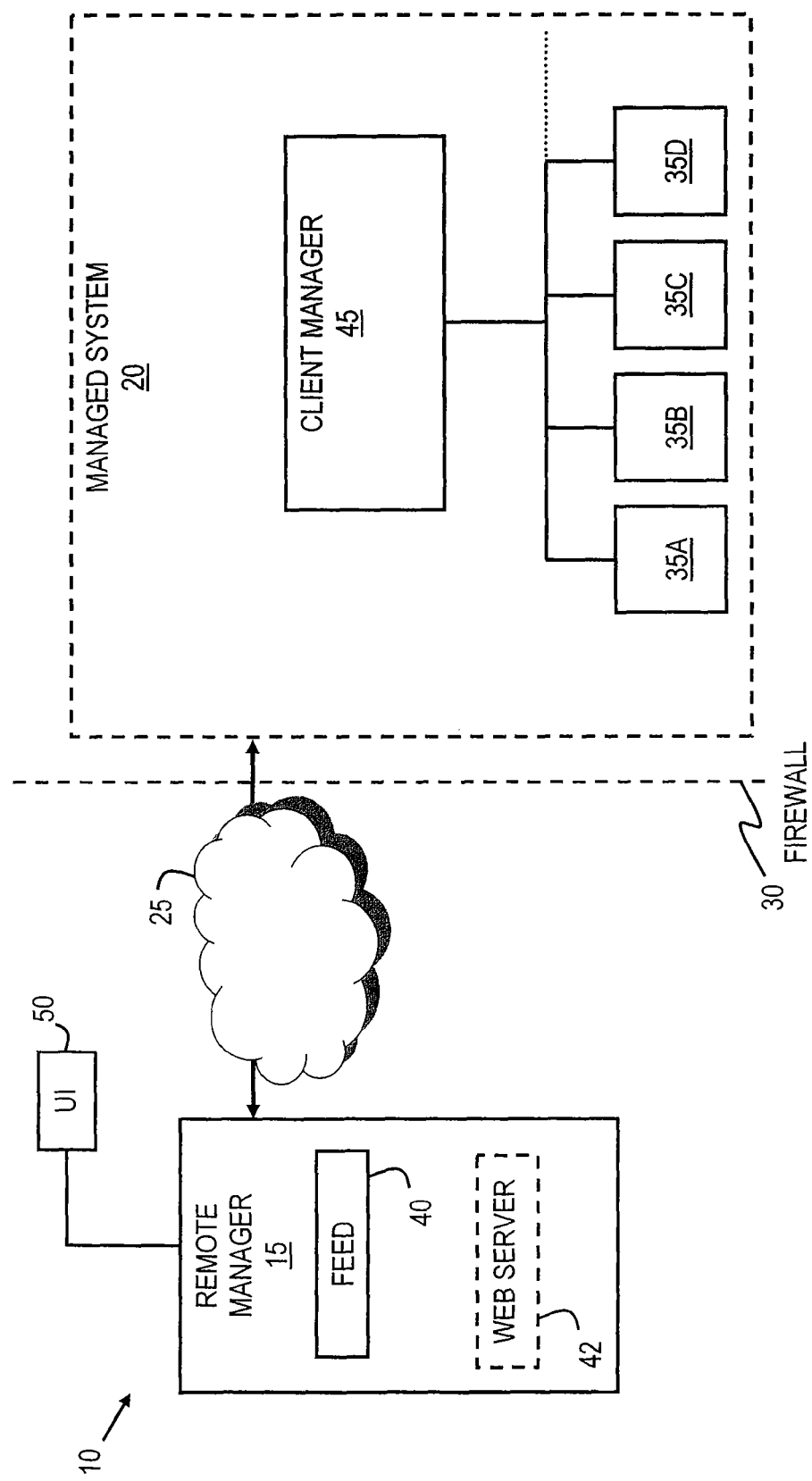
FIG. 1 illustrates one example computer system according to one or more embodiments.

FIG. 1 illustrates a global computer system 10 according to one or more embodiments of the invention. System 10 includes a remote manager 15 coupled to a managed system 20 via a network 25. Network 25, in one example, is the Internet, but may be any combination of public and private networks. System 10 also includes a firewall 30 that secures managed system 20 by shielding it from unauthorized accesses by hackers in the event that network 25 is available publicly, such as when network 25 is the Internet. Firewall 30 may be implemented in either software or hardware.

Managed system further includes one or more sub-systems 35A-35D and remote manager 15 is, in one example, configured to control various aspects of sub-systems 35A-35D via network 25. Sub-systems 35A-35D may be any type of hardware requiring periodic maintenance, such as a Sun Server Machine (e.g., Sun Blade 8000), a printer, a network interface card, a wireless email device, etc. Sub-systems 35A-35D may also be uniquely software entities such as applications and software services, where the particular hardware that the software is residing on is not required to be managed as one of subsystems 35A-35D.

Aspects of sub-systems 35A-35D that may be controlled by remote manager 15 include (but are not limited to) controlling particular software loaded on sub-systems 35A-35D, rebooting sub-systems 35A-35D, installing software patches, monitoring operating conditions for each of the sub-systems 35A-35D, such as temperature, fan speed, processor load, disk read/write failures, network loads, service levels, etc. In one or more embodiments, remote manager 15 and sub-systems 35A-35D are located in separate geographic locations and remote manager 15 provides remote control of the various aspects of sub-systems 35A-35D. As such, one entity may own and operate managed system 20 while a separate entity owns and operates remote manager 15. Thus, the owner of managed system 20 may delegate responsibility for the day-to-day system administration tasks of sub-systems 35A-35D to a separate entity that specializes in such administration.

As mentioned previously, firewall 30 blocks certain outside accesses that may occur via network 25, including information coming from remote manager 15. Remote management protocols, such as simple network management protocol (SNMP), remote management invocation (RMI), and java management extensions (JMX) are methods for performing remote management across the network, but in conventional implementations, they all require firewall 30 to be configured as "fully routed" between sub-systems 35A-35D and remote manager 15 by opening up specific management ports in the firewall configuration. For example, fully routing may include modifying one or more router tables to specifically configure a port for specific administrative commands. Furthermore, firewall 30 may in any case prevent direct communication between remote manager 15 and sub-systems 35A-35D because managed system 20 may present itself to the Internet as a single IP address and translates internal IP addresses for sub-systems 35A-35D (also known as network address translation).

Notwithstanding the complications created by firewall 30, system 10 achieves remote management of sub-systems 35A-35D by sending management details within a configurable channel feed 40 between remote manager 15 and one or more items on the other side of firewall 30 that monitors feed 40. Feed 40 includes configuration details and commands to be performed by sub-systems 35A-35D. In one or more embodiments, feed 40 is posted by remote manager 15 to a web server 42 that is then read and parsed by a client manager 45. Web server 42 may be located on either side of firewall 30.

In one or more embodiments, client manager 45 is located on the same side of firewall 30 as sub-systems 35A-35D and is operable to read and parse the data in feed 40 asynchronous to the actions of remote manager 15. Hence, remote manager 15 may distribute commands (for example via feed 40) to sub-systems 35A-35D regardless of whether sub-systems 35A-35D are otherwise engaged in other actions at the time remote manager 15 distributes its commands for sub-systems 35A-35D. Once data in feed 40 is parsed by client manager 45, client manager 45 directs one or more of sub-systems 35A-35D according to the commands included in feed 40. Accordingly, configuration details and commands for sub-systems 35A-35D channel come through firewall 30 just as any other source of data via the Internet without special configuration of firewall 30 or without remote manager 15 needing to know the precise IP address of a particular sub-system. It is certainly possible to provide special firewall configurations and include IP address information, but such is not required.

Feed 40 may take many forms, and in one or more embodiments, is in the extensible markup language (XML) format, thereby allowing data to be posted to web server 42 and exchanged between remote manager 15, client manager 45, and sub-systems 35A-35D regardless of their particular operating systems. For example, feed 40 in XML form may be read by client manager 45 with a web browser using normal hyper-text transfer protocol (http), or alternatively, in secure hyper-text transfer protocol (https) if feed 40 is implemented in secure form. Furthermore, in one or more embodiments, configurable channel feed 40 is implemented by remote manager 15 in an XML syndication format, such as the really simple syndication (RSS) or ATOM feed formats. XML syndication formats are typically used to aggregate and rapidly scan information from blogs, news and current event Web sites, and other Web sites that update content frequently. By posting feed 40 to a website in an XML syndication format, client manager 45 may aggregate and rapidly scan configuration details and commands posted by remote manager 15 using a simple web reader, such as Google Reader or the like. For example, client manager 45 may dedicate a single thread to reading the header information from feed 40 and determine if client manager 45 has the appropriate handler for the particular protocol from feed 40. If client manager 45 does not have the appropriate handler for the protocol specified in feed 40, then client manager 45 may handoff the command to one of sub-systems 35A-35D. Notably, this does not require specialized software to be loaded on sub-systems 35A-35D, client manager 45, or remote manager 15. Furthermore, the information conveyed is human-readable and may be displayed on a user interface 50.

Once client manager 45 parses feed 40 it takes appropriate action by implementing configuration details and/or commands on sub-systems 35A-35D and then posts the results as an update to the corresponding entry on feed 40 in XML format. In this manner, entries in feed 40 not only contain commands and/or configuration details in human-readable XML format, but it also contains the results of client manager 45 executing these details. A system administrator from managed system 20 can easily review feed 40 via user interface 50 and determine not only the commands and configuration details from remote manager 15 but also the results of client manager 45 attempting to implement them (e.g., successful, error message, pending, etc.). Alternatively, the feed 40 may be reviewed automatically without a system administrator, e.g., using software. Successfully fulfilled execution sequences may be moved off feed 40 and archived, being made available through an archived version of feed 40. User interface 50 may be located within managed system 20, or alternatively, may be located outside managed system 20 without impacting its operation.

Figure 2:
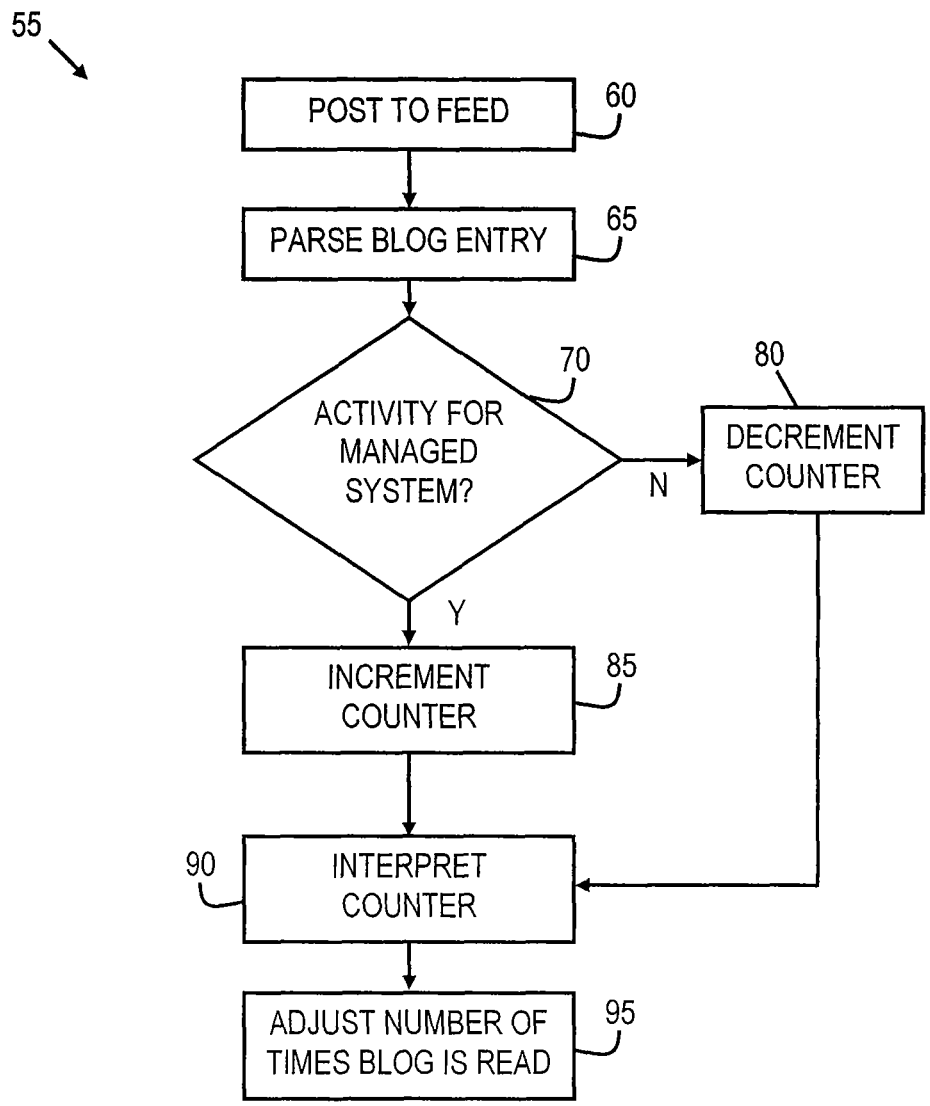
FIG. 2 is a flow chart illustrating one method of achieving remote administration according to one or more embodiments.

FIG. 2 depicts a flow chart 55 illustrating one method of achieving remote administration using system 10. In block 60, remote manager 15 posts configuration details and commands to feed 40 in a syndicated XML format. Client manager 45 reads and parses feed 40 asynchronous to the operations of remote manager 15 in block 65. To conserve bandwidth over network 25, client manager 45 may optimize how it accesses network 25 in parsing feed 40. As shown in block 70, client manager 45 determines if feed 40 contains configuration activities or other tasks to be performed on sub-systems 35A-35D. If client manager 45 determines that feed 40 contains no activity for sub-systems 35A-35D, then it will decrement a counter 75 (shown in FIG. 1). This action is represented in block 80 of flow chart 55. Counter 75 may be implemented in either hardware or software and may be within or external to client manager 45. If client manager 45 determines that feed 40 does contain configuration activities or other tasks to be performed on sub-systems 35A-35D, then client manager 45 will increment counter 75 as shown in block 85. Ultimately, the value in counter 75 will reflect the relative level of activity that feed 40 is directing client manager 45 to perform. Client 45 may periodically interpret this activity and adjust the number of times and frequency that it reads and parses feed 40. These actions are represented in blocks 90 and 95 respectively. The adjustment in block 95 may be pre-determined according to a mathematical relationship (e.g., linear decrease/increase, exponential decrease/increase, etc.) or may be heuristically determined.

In some embodiments, interpreting the counter value (shown in block 90) will include monitoring how the counter value changes over time. For example, if the counter value continually increases each time client manager 45 checks for activity, then this indicates that client manager 45 need not adjust the number of times it reads feed 40 in block 95. Alternatively, if the counter value continually decreases each time client manager 45 checks for activity, then this indicates that client manager 45 can reduce the number of times it reads feed 40 to reduce the load on network 25.

In other embodiments, client manager 45 may obtain information as to how often it should read feed 40 from information contained within feed 40 itself. For example, remote manager 15 may inform client manager 45 that it will update the content of feed 40 every twenty four hours at six o'clock in the morning, and therefore, client manager 45 would not need to consume bandwidth over network 25 by continually checking feed 40 at times not specified by remote manager 15.

In still other embodiments, remote manager 15 and client manager 45 may operate in lock step fashion to conserve bandwidth over network 25. For example, remote manager 15 may instruct client manager 45 to reboot sub-system 35A and then return and report to remote manager 15 via feed 40 upon completion of the reboot. By operating in this manner, remote manager 15 and client manager 45 would not need to consume bandwidth over network 25 by continually checking via feed 40 for further instructions regarding sub-system 35A. Instead, client manager 45 could wait for sub-system 35A to complete its reboot and communicate with remote manager 15 via feed 40 for further instructions.

Some embodiments include methods and apparatuses that allow caching and data persistence in Java management protocols such that network traffic may be minimized. For example, a JMX Connector client may be coupled between the client and server of a JMX connection such that no changes in the client or server code need to be implemented other than directing the client and server to the JMX Connection's service uniform resource locator (URL) to indicate a cached connection.

FIG. 3 depicts managed system 300 including one or more management servers 305. The managed system 300 may be implemented on a physical machine in some embodiments. In other embodiments, the managed system 300 may be implemented on a virtual machine, such as a Java Virtual Machine (JVM).

The managed system 300 may further include one or more communication adaptors 310 that allow the management servers 305 to couple to one or more management applications 315. The management applications 315 may be clients of the management servers 305 and include graphical user interfaces and/or command line interfaces. In the event that the management applications 315 include graphical user interfaces, a system administrator 320 may request information of objects within the control of the management servers 305.

Management servers 305 may include a registry for objects, within the managed system 300, that are exposed to management operations. Examples include CPU utilization, disk usage, online status, network usage, and/or model number of the CPU to name but a few. Objects registered with the management server may become visible to the one or more management applications 315 that request these management operations, but only to the extend allowed by the management server 305. For example, in some embodiments, the management server may be an MBean-type server if the managed system 300 is a JMX system. In this example, the MBean server may only expose the management application 315 to its own management interface rather than the management interface of the object it references.

In some embodiments, the management applications 315 may execute on a separate JVM than the management servers 305 separated by a network connection 325. The network connection 325 may be a local intranet or the Internet. In some cases, the management applications 315 and the servers that they manage (i.e., the management servers 305) may be separated by large geographical distances.

Because the management servers 305 and the management applications 315 may reside on separate JVMs and/or different physical machines, the performance of the connection 325 may be orders of magnitude slower than the performance of a management application running on the same JVM or even the same physical machine. For example, if the management applications 315 are responsible for rendering GUI views to the system administrator 320 of various management servers 305 that are in different JVMs and/or physical devices, then the management applications 315 may have to wait for responses from each of the management servers 305 before rendering an accurate GUI of the status of the managed system 300. In this manner, as the size of the requests becomes smaller and smaller, the latency of the connection 325 may dominate the overall latency of the view rendered to the system administrator 320 regardless of the type of management client implemented (JMX, SNMP, etc.). Also, if for some reason there is a network outage and the connection 325 becomes unavailable then the status of the managed system 300 may be completely unavailable. In this scenario, the management applications 315 would also like to view a read-only view of the machine's previous state, and the timestamps of the last time when that state was known to be valid.

Some embodiments may implement a client-side cache connector 330 on the same JVM and/or physical machine as the management applications 315 and also implement a server-side cache connector 335 on the same JVM and/or physical machine as the managed system 300. The two cache connectors 330, 335 may form a management connection between the applications 315 and the system 300 such that no changes in the code are required in the client-side or the server-side other than to prefix the JMX service URL used for the connector 325 to indicate the use of a cached connection. In other words, a dynamic library on the client side may change, but the code on the client and server side may stay the same.

Notably, the processing required to implement the server-side cache connector 335 may be distributed across the entire managed system 335 rather than focused on a single machine, e.g., the JVM and/or physical machine on the client side implementing the management applications.

During operation, the server-side cache connector 335 may be implemented for each object that the managed servers 305 monitor. The server-side cached connector may store a local copy of certain objects being monitored (e.g., CPU utilization, disk usage, online status, network usage, and/or model number of the CPU), which may or may not be on separate JVMs and/or physical machines. Certain items may be classified in the cache connector 335 as unchanging with respect to time or read-only (such as a particular chipset installed in a sub-system). Other items may be classified in the cache connector 335 as changing with respect to time (operating temperature, processor load, etc.).

For items that do change with respect to time, a timestamp may be associated with each stored value. That is, along with sending the temperature of a particular physical machine, a timestamp of that particular temperature also may be stored in the client-side cache connector 330. In addition, for items that do change with respect to time, some embodiments include sending only differences between previous values and new values to be stored in the client-side cache connector 330 (sometimes referred to as "deltas"). This may allow a reduction in the overall bandwidth requirements of the network 325 when updating the client-side cache connector 330 to be consistent with values stored in the server-side cache connector 335, which may allow the most current information to be continually conveyed to the user 320 while minimizing bandwidth needs of the network 325. In some embodiments, these deltas may be conveyed to the client-side cache connector 330 together in bulk format.

The client-side cache connector 330 may receive copies of data from the server-side cache connector 335 asynchronously. In this manner, the management applications 315 that request managed data from the managed system 300 may not have to wait for synchronous communication between each of the management servers 305 and the management applications 315, which may be particularly desirable when each of the management servers 305 are in separate JVMs and/or physical machines that may be geographically distant from the management applications 315.

Also, by storing copies of the unchanging data from the server-side cache connector 335 in the client-side cache connector 330, unchanging items may be resolved locally by the client-side cache connector 335 such that access to the managed system 300 via the network 325 may be avoided, along with avoiding the latency that comes with accessing numerous items via the network 325.

FIG. 4 depicts a flow chart 418 that may be implemented by the managed system 300 in fulfilling cache requests locally. At block 420, a request for information about objects managed by the management servers 305 is generated. This may happen as a result of a system administrator 320 requesting to know, for example, how big of a hard drive certain items within the managed system 300 have. The size of the hard drive in the managed system 300 may be considered an unchanging read-only parameter. As mentioned previously, the managed system 300 may periodically store objects managed by the management servers 305 in its server-side cache connector 335 and asynchronously stored this information to the client-side cache connector 330 without being requested by the management applications 315. In block 425, if the information requested is read-only information (as is the case with the size of the hard drive) the request for information may be resolved locally with information stored in the client-side cache 330 without having to go to each managed object to obtain the information (see block 430), thereby reducing the latency associated with devices on separate JVMs and/or physical machines. On the other hand, if the information is not read-only, then the management applications 315 may need to request this information from each of the management servers 305 as shown in block 435. In some embodiments, the server-side cache 335 may be unavailable (e.g., due to network outage), and therefore, the request may need to be resolved locally (per block 430) until the server-side cache 335 is available once again. As mentioned previously, the actions of block 430 may take much longer to fulfill than block 425. Also, as was mentioned previously, no software changes to the managed system 300 or the management applications 315 are required other than in the connection service URL.

Furthermore, in some embodiments, the client-side cache connector 330 may maintain a persisted copy of the cached data (changing and/or unchanging plus timestamps) such that when the management applications 315 provide remote management data more quickly on startup. For example, certain managed objects, like disk usage, may be required every five minutes. By implementing persistence in the client-side cache connector 330, a restart of the client-side cache connector 330 may occur more quickly because the disk usage may be substantially up to date and require only a few deltas.

Communication between the client cache connector 330 and the server cache connector 335 may occur via a feed, such as, the feed 40 described above in FIGS. 1 and 2. For example, communication between the client cache connector 330 and the server cache connector 335 may occur via an ATOM feed over a secure https feed. In this manner, the client cache connector 330 and the server cache connector 335 may communicate through a firewall using non-specialized communication protocols.

One or more of the above described embodiments may be implemented as computer software in the form of computer readable code akin to exemplary computer source code listing submitted herewith. This code may be executed on a general purpose computer such as computer 500 illustrated in FIG. 5, or in the form of programs or class files executable within a runtime environment (e.g., the Java™ Runtime Environment) running on such a computer. Computer system 500 may include many different environments and topologies, including those shown in FIGS. 1 and 3.

Figure 5:
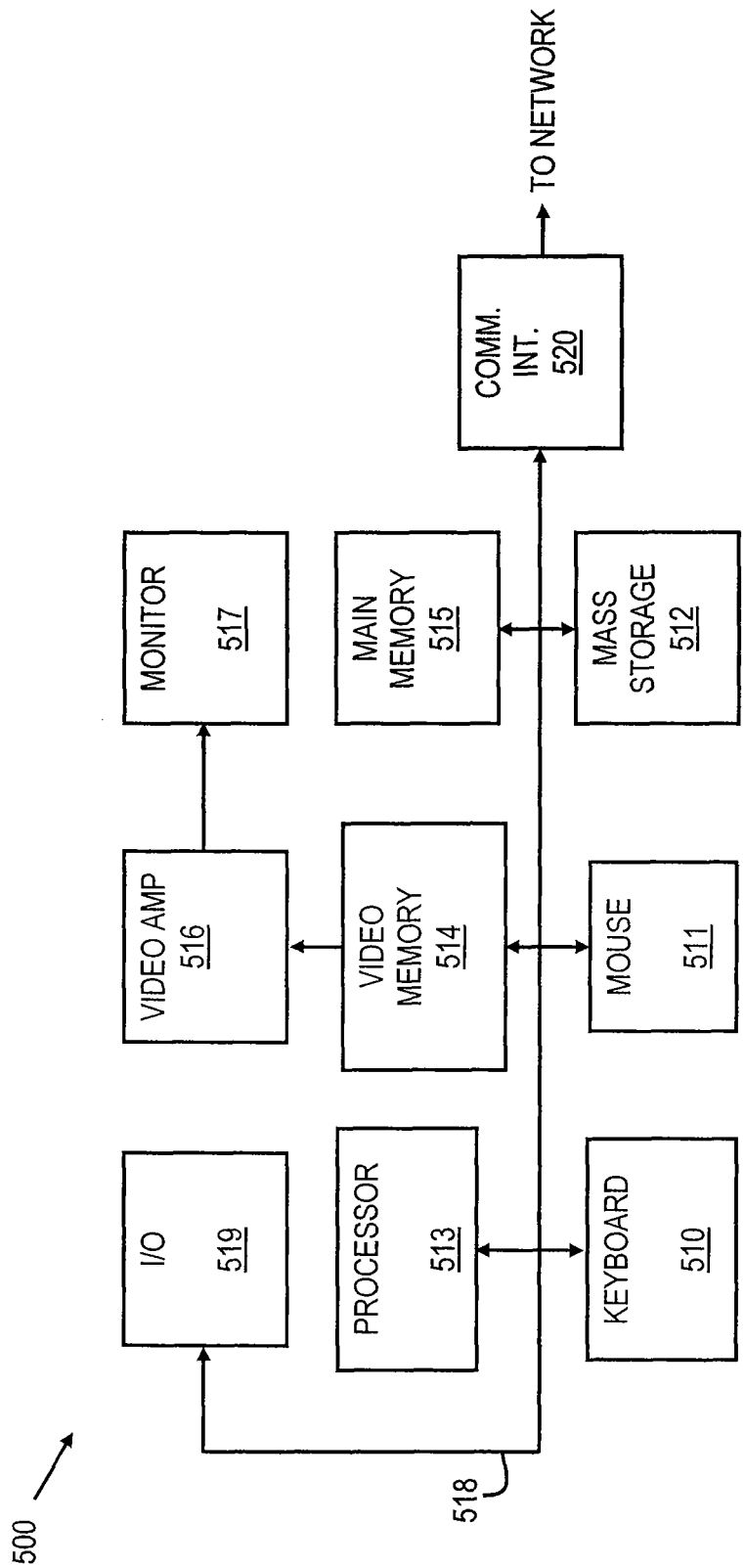
FIG. 5 represents a general purpose computer according to one or more embodiments.

Referring to computer system 500 shown in FIG. 5, a keyboard 510 and mouse 511 are coupled to a system bus 518. Keyboard 510 and mouse 511, in one example, introduce user input to computer system 500 and communicate that user input to a processor 513. Other suitable input devices may be used in addition to, or in place of, mouse 511 and keyboard 510. An input/output unit 519 (I/O) coupled to system bus 518 represents such I/O elements as a printer, audio/video (NV) I/O, etc.

Computer 500 may also include a video memory 514, a main memory 515 and a mass storage 512, all coupled to system bus 518 along with keyboard 510, mouse 511 and processor 513. Mass storage 512 may include both fixed and removable media, such as magnetic, optical or magnetic optical storage systems or any other available mass storage technology. Bus 518 may contain, for example, address lines for addressing video memory 514 or main memory 515. System bus 518 also includes, for example, a data bus for transferring data between and among the components, such as processor 513, main memory 515, video memory 514 and mass storage 512.

In some embodiments, processor 513 is a SPARC™ microprocessor from Sun Microsystems, Inc., or a microprocessor manufactured by Motorola, such as the 680XX0 processor, or a microprocessor manufactured by Intel, such as the 80X6, or Pentium processor. Any other suitable microprocessor or microcomputer may be utilized, however. Main memory 515 may include dynamic random access memory (DRAM), static random access memory (SRAM), magnetic random access memory (MRAM) or the like. Video memory 514 may be a dual-ported video random access memory. One port of video memory 514, in one example, is coupled to video amplifier 516, which is used to drive a monitor 517. Monitor 517 may be any type of monitor suitable for displaying graphic images, such as a cathode ray tube monitor (CRT), flat panel, or liquid crystal display (LCD) monitor or any other suitable data presentation device.

Computer 500 also may include a communication interface 520 coupled to bus 518. Communication interface 520 provides a two-way data communication coupling via a network link, such as network 25 or 110. For example, communication interface 520 may be an integrated services digital network (ISDN) card or a modem, a local area network (LAN) card, or a cable modem or wireless interface. In any such implementation, communication interface 520 sends and receives electrical, electromagnetic or optical signals which carry digital data streams representing various types of information.

Code received by computer 500 may be executed by processor 513 as it is received, and/or stored in mass storage 512, or other non-volatile storage for later execution. In this manner, computer 500 may obtain application code in a variety of forms. Application code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

The above discussion is meant to be illustrative of the principles and various embodiments of the present invention. Numerous variations and modifications will become apparent once the above disclosure is fully appreciated. In addition, the above description has broad application, and the discussion of any embodiment is meant only to be exemplary, and is not intended to intimate that the scope of the disclosure, including the claims, is limited to these embodiments.

We claim:

1. A remotely managed computer system, comprising:
    one or more management servers comprising a registry of manageable objects, the one or more management servers being executed on a first machine;
    one or more management applications coupled to the one or more management servers, the one or more management applications being executed on a second machine, wherein the first and second machines are separate, and wherein each of the one or more management applications is configured to generate a request for information regarding one or more of the manageable objects in response to an input received at the second machine;
    a first cache connector located at the first machine and coupled to the one or more management servers, wherein the first cache connector retrieves and stores the manageable objects listed in the registry, the first cache connector comprising a particular classification for each of the at least one of the manageable objects, the particular classification selected from the group consisting of a changing object and a non-changing object, the changing object corresponding to manageable objects that change value with respect to time, the non-changing object corresponding to manageable objects that do not change value with respect to time;
    a second cache connector located at the second machine and coupled to the one or more management applications, wherein the first and second cache connectors form a cache management connection to enable the first cache connector to only store object data associated with each of the manageable objects classified as the non-changing object manageable objects in the second cache connector; and wherein the one or more management applications:
        retrieve object data from the second cached connector when the request for information is for a particular manageable object classified as the non-changing object; and
        retrieve object delta data from the first cached connector when the request for information is for a different particular manageable objects classified as the changing object, the object delta data corresponding the difference in data values of the different particular manageable object over a period of time; and
    wherein processing required to implement the first cache connector is distributed across the first machine.

2. The remotely managed computer system of claim 1, wherein the first and second machines are Java Virtual Machines (JVMs).

3. The remotely managed computer system of claim 1, wherein the one or more management applications includes a graphical user interface (GUI).

4. The remotely managed computer system of claim 3, wherein the computer system receives the request for information about at least some of the manageable objects within the control of the management server via the GUI.

5. The remotely managed computer system of claim 1, wherein the one or more management servers are MBean servers.

6. The remotely managed computer system of claim 1, wherein the changing objects include disk usage.

7. The remotely managed computer system of claim 1, wherein timestamps are provided with the changing objects.

8. The remotely managed computer system of claim 1, wherein the cache management connection is operated according to a java management extension (JMX) protocol.

9. The remotely managed computer system of claim 1, wherein the cache management connection is non-operational and the one or more management applications resolves a request for manageable objects from a location within the second machine.

10. The remotely managed computer system of claim 9, wherein the first and second cache connectors communicate information via an ATOM feed through a firewall.

11. A method for remotely managing a computer system, comprising the acts of:
    executing one or more management servers comprising a registry of manageable objects on a first machine;
    executing one or more management applications on a second machine, wherein the one or more management applications are coupled to the one or more management servers, and wherein each of the one or more management applications is configured to generate a request for information regarding one or more of the manageable objects in response to an input received at the second machine;
    retrieving at least one of the manageable objects listed in the registry with a first cache connector located at the first machine, the first cache connector comprising a particular classification for each of the at least one of the manageable objects, the particular classification selected from the group consisting of a changing object and a non-changing object, the changing object corresponding to manageable objects that change value with respect to time, the non-changing object corresponding to manageable objects that do not change value with respect to time;

storing at least one of the manageable objects listed in the registry with the first cache connector;

forming a cache management connection between the first cache connector and a second cache connector located at the second machine to enable the first cache connector to selectively store the manageable objects listed in the registry in the second cache connector; and wherein the one or more management applications;

distributing the processing required to implement the first cache connector across the first machine;

retrieving object data at the one or more management applications from the second cached connector when the request for information is for a particular manageable object classified as the non-changing object; and retrieving object delta data at the one or more management applications from the first cached connector when the request for information is for a different particular manageable objects classified as the changing object, the object delta data corresponding the difference in data values of the different particular manageable object over a period of time.

12. The method of claim 11, wherein the management applications include a GUI and the computer system receives requests for information about at least some of the manageable objects within the control of the management server via the GUI.

13. The method of claim 11, further comprising the act of resolving a request for manageable objects from a location within the second machine when the cache management connection is non-operational.

14. The method of claim 13, wherein the first and second cache connectors communicate information via an ATOM feed through a firewall.

* * * * *

UNITED STATES PATENT AND TRADEMARK OFFICE
CERTIFICATE OF CORRECTION

| | | |
|---|---|---|
| PATENT NO. | : 8,694,623 B1 | Page 1 of 1 |
| APPLICATION NO. | : 12/178398 | |
| DATED | : April 8, 2014 | |
| INVENTOR(S) | : Stephen et al. | |

It is certified that error appears in the above-identified patent and that said Letters Patent is hereby corrected as shown below:

In the Claims

Claim 1,
- column 9, line 59, delete "at least" and after the word "one" insert -- or more --;
- column 9, line 60, delete "the" and replace with -- a --;
- column 10, line 5, delete "object";
- column 10, line 8, after "retrieve" insert -- the --;
- column 10, line 15, delete "the" and replace with -- a --;
- column 10, line 17, delete "object" and replace with -- objects --.
Claim 4,
- column 10, line 29, delete the first occurrence of "the"; after the second occurrence of "the" insert -- one or more --; delete the word "server" and replace with -- servers --.
Claim 6,
- column 10, line 34, delete "objects include" and replace with -- object includes --.
Claim 7,
- column 10, line 36, delete "objects" and replace with -- object --.
Claim 11,
- column 10, line 65, delete "the" and replace with -- a --;
- column 11, line 4, after "storing" insert -- the --;
- column 12, line 3, delete "the" and replace with -- a --;
- column 12, line 4, delete "object" and replace with -- objects --.
Claim 12,
- column 12, line 6, after "wherein the" insert -- one or more --;
- column 12, line 9, after the second occurrence of "the" insert -- one or more --.

Signed and Sealed this
Twentieth Day of January, 2015

Michelle K. Lee
*Deputy Director of the United States Patent and Trademark Office*